UNITED STATES PATENT OFFICE.

ALFRED KERN, OF BASLE, SWITZERLAND, AND CARL LUDWIG MÜLLER, OF LUDWIGSHAFEN-ON-THE-RHINE, GERMANY, ASSIGNOR TO THE BADISCHE ANILIN AND SODA FABRIK, OF MANNHEIM, GERMANY.

PRODUCTION OF BLUE DYE-STUFFS.

SPECIFICATION forming part of Letters Patent No. 327,953, dated October 6, 1885.

Application filed June 9, 1885. Serial No. 168,181. (No specimens.)

*To all whom it may concern:*

Be it known that we, ALFRED KERN, a citizen of the Swiss Republic, residing at Basle, in the canton of Basle, in Switzerland, and CARL LUDWIG MÜLLER, a subject of the King of Bavaria, residing at Ludwigshafen-on-the-Rhine, in the Empire of Germany, have invented new and useful Improvements in the Manufacture of a Blue Dye-Stuff or Coloring Matter, of which the following is a specification.

This invention relates to an improved process for preparing "triphenyltrimethyl rosaniline," a blue coloring matter discovered by Alfred Sarauw, and described by him (in his inaugural dissertation, Zurich, A. D. 1881,) as resulting from the action of oxychloride of carbon (phosgene) upon methyldiphenylamine.

According to the said improved process one hundred parts by weight of methyldiphenylamine are heated to about 100° centigrade, and then under constant agitation a current of gaseous oxychloride of carbon (phosgene gas) is slowly allowed to enter in sufficient quantity to produce an increase of weight amounting to about twenty-five parts, by weight. We then add about twenty parts, by weight, of dry and finely-powdered chloride of zinc, and after about six hours constant agitation, and while maintaining the temperature of the mixture at about 100° centigrade, we again add a fresh supply of oxychloride of carbon in sufficient quantity to produce an increase of weight of the mixture amounting to about twelve parts, by weight. The reaction is then allowed to proceed at the said temperature during the space of about three or four hours, or until a bronze-like "melt" has been formed.

In order to separate the coloring matter thus produced from any methyldiphenylamine which may have remained unacted upon and from other products contained in the said melt, any of the various methods may be employed which are in use for a similar purpose. We have found it convenient first to treat the crude coloring matter with caustic-soda liquor and steam, so as to volatilize the excess of methyldiphenylamine, (which may thus be recovered by distillation,) and to obtain the base of the coloring matter. The base thus obtained is then dissolved in about two hundred parts, by weight, of sulphuric acid of about 64° Baumé at a temperature of about from 70° to 80° centigrade, and while maintaining the said temperature, about fourteen hundred parts, by weight, of hydrochloric acid of about 28° Baumé are gradually added, when the coloring matter will be again precipitated in a cohesive mass, and may then be easily separated from the cooled-down acid solution by decantation. A further purification of the coloring matter thus produced is effected by washing the same first with strong hydrochloric acid and afterward with hot water until the acid mother-liquor has been completely moved. The hydrochlorate of "triphenyltrimethyl rosaniline" thus prepared is then dried in a steam-pan and ready for use.

What we claim as new, and desire to secure by Letters Patent, is—

The improved process for manufacturing trimethyltriphenyl rosaniline by the reaction of oxychloride of carbon (phosgene) upon methyldiphenylamine, followed by digestion of the warm mass with chloride of zinc and oxychloride of carbon, separation of the base from the residual matters, and final purification by washing with acids to remove the mother liquid, substantially as described.

In testimony whereof we have hereunto set our hands and seals in the presence of two subscribing witnesses.

ALFRED KERN. [L. S.]
CARL LUDWIG MÜLLER. [L. S.]

Witnesses:
HEINRICH CARO,
FRANZ ENGLERT.